H. K. HARRIS.
ADVERTISING AND OTHER DEVICE.
APPLICATION FILED AUG. 14, 1917.

1,375,508.

Patented Apr. 19, 1921.

Inventor
Henry Kingsford Harris

H. K. HARRIS.
ADVERTISING AND OTHER DEVICE.
APPLICATION FILED AUG 14, 1917.

1,375,508.

Patented Apr. 19, 1921.
6 SHEETS—SHEET 4.

Inventor.
Henry Kingsford Harris.

H. K. HARRIS.
ADVERTISING AND OTHER DEVICE.
APPLICATION FILED AUG. 14, 1917.

1,375,508.

Patented Apr. 19, 1921.
6 SHEETS—SHEET 5.

Inventor.
Henry Kingsford Harris.

H. K. HARRIS.
ADVERTISING AND OTHER DEVICE.
APPLICATION FILED AUG 14, 1917.
1,375,508.
Patented Apr. 19, 1921.
6 SHEETS—SHEET 6.
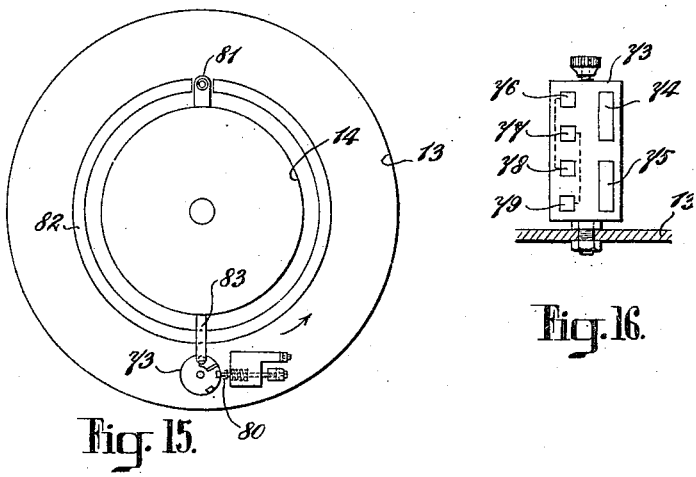
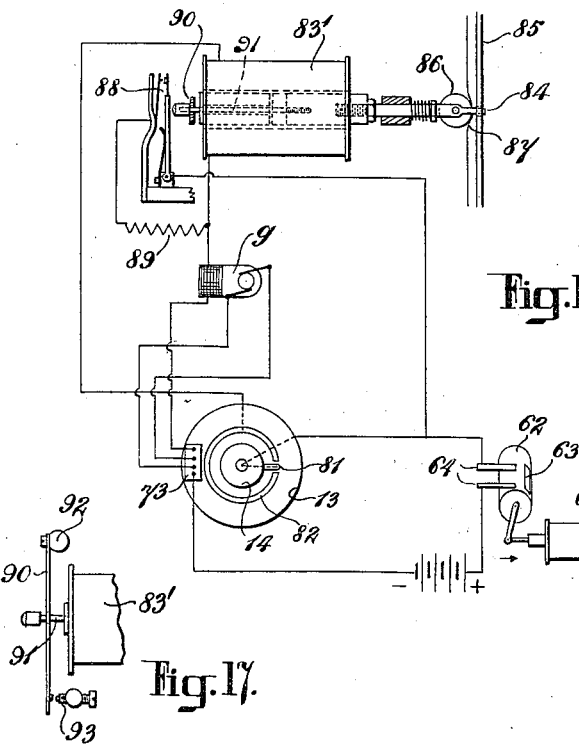

UNITED STATES PATENT OFFICE.

HENRY KINGSFORD HARRIS, OF WESTMINSTER, LONDON, ENGLAND.

ADVERTISING AND OTHER DEVICE.

1,375,508.  Specification of Letters Patent.  Patented Apr. 19, 1921.

Application filed August 14, 1917. Serial No. 186,207.

*To all whom it may concern:*

Be it known that I, HENRY KINGSFORD HARRIS, a subject of the King of Great Britain and Ireland, residing at 96 Victoria street, Westminster, London, England, have invented certain new and useful Improvements in Advertising and other Devices, of which the following is a specification.

This invention refers to advertising and other devices provided with a selective part or a series of such parts adapted to be brought into successive positions in order to control the movement of exhibiting means in the case of advertising devices and of analogous parts which have to be set into predeterminable positions in the case of other devices.

With devices of this description as hitherto constructed it has been necessary, when the exhibiting or equivalent part or unit, is adapted to be set in either direction for the operator at the transmitting station to take into account the last setting, of the band or its equivalent in the controlled or advertising unit, when making a fresh setting—a procedure which is likely to lead to errors or for the band or the like to be returned to the initial position between each two settings, which causes loss of time.

My present invention relates to a greatly improved mechanism of the selective type primarily adapted for use with advertising devices, but also adapted for use with other types of controlled mechanism which are driven or brought into position by an intermittent or continuous step by step or like motion.

With my new selective mechanism, I so arrange the parts and so construct them, that in order to cause the controlled mechanism, to move from one position to any other required position it is only necessary to set a part to the required indication in the setting or transmitting portion of the device, the mechanism itself then automatically taking the last setting of the controlled unit into account and determining in which direction and through what number of steps or distances the controlled mechanism shall be moved, in order to proceed directly from the last selected position to the next, thus eliminating the chance of error and saving time.

According to the general principle of my invention I provide in combination with the advertising or like device, a controlling mechanism (for bringing the band or other device carrying a letter or the like into position); driving means for driving the said mechanism, a part adapted to be set into position for determining the indication to be exhibited (that is the position where the band or the like is to be stopped) means for starting the driving mechanism, means for stopping the driving mechanism and means for reversing the driving mechanism, the means for setting the first mentioned part and the means for stopping the mechanism being so displaceable with respect to one another that when the exhibiting means or part to determine the indication is brought into position and comes to rest after each indication is set, the displacement between the parts bears a proportional relation to the distance of the exhibiting unit from its zero position, the result being that when the next setting is effected the mechanism automatically takes into account the position of the exhibiting unit or equivalent part and also operates the reversing means if necessary so that the exhibiting device proceeds directly from the last setting to the next required and moves in the correct direction for this purpose.

The setting part or parts which has to be set into position to determine the letter or the like to be exhibited, may be operated directly mechanically or by hand, or by electrical means by the transmission of impulses from a distance.

The controlled mechanism may be an advertising device such as a unit with a band having letters or symbols thereon adapted to be brought successively into position or, it may be a secondary mechanism for instance of the jacquard type adapted to determine the position of the parts in the advertising unit, so as to form built up letters or the like or pictures.

The part for stopping the movement of the driving mechanism may be located in close proximity to the setting or selecting part or it may be at any required distance therefrom and suitably connected thereto and one or both of these parts may be located either at the exhibiting station in connection with the exhibiting unit or it may be at the transmitting station. One typical form of selector mechanism constructed according to my present invention comprises a moving part such as a toothed wheel, quadrant, arm, strip, rack or its equivalent which I term "the selector," or in the case of a wheel, "the selector wheel" which moving part is adapted to be moved away from a zero position through a rectilinear or angular distance corresponding to a number of stops, for the purpose of selecting the particular indication required, and another moving part, which may also be a wheel, quadrant, strip, rack or its equivalent and which I term "the counter" or in the case of a wheel, "the counter wheel." This counter is suitably mounted with respect to the selector so that the one may be displaced with respect to the other through a desired rectilinear or angular distance. I also provide mechanism operated mechanically, electrically or otherwise by the exhibiting means as the required indication is brought into position for moving the counter through a number of steps corresponding to the number of indications through which the exhibiting band or the like passes in proceeding from its initial position to the required indication. I further provide means in connection with the counter or adapted to be operated through the movement of the counter for throwing the driving power out of action when a predetermined part of the counter comes into a certain relative position with respect to the selector. In addition I provide means which may in some cases be combined with the last mentioned means, for reversing the direction in which the exhibiting unit is driven when the parts come into certain relative positions.

Suitable pawls or their equivalents are provided for enabling the parts to be locked from movement or moved together when required as well as the necessary springs, weights or the like for operating the parts.

In principle the parts are so combined that in all exhibiting positions of the bands or the like the part of the counter or part coupled to the counter which causes the stoppage of the driving mechanism is removed from the point at which such part rests when the exhibiting band is in its zero position by a number of steps corresponding to the number of the indication from the said zero position, the result being that when the selector is set forward through a number of steps to determine a fresh indication, the number of steps already shown is automatically taken into account, in such a way that the indicating band only travels in the correct direction from the last position in which the drive was thrown out to the new position.

And in order that my said invention may be better understood I will now proceed to describe various typical methods of carrying the same into effect, with reference to the drawings accompanying this specification it being of course understood as will be hereinafter more fully pointed out that the essential parts of the mechanism may be combined in a number of other ways without departing from the principle of my invention, and in order to secure the same results.

In the drawings:—

Figs. 6 to 13 inclusive show diagrams to illustrate the action of the selector.

Figure 20:
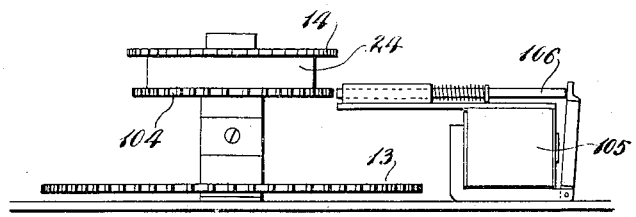

Fig. 14 shows electrical diagram of another method of carrying the invention into effect;

Figs. 15, 16 and 17 show details in connection with same;

And Figs. 18 to 20 show details used in this form.

Figure 2:
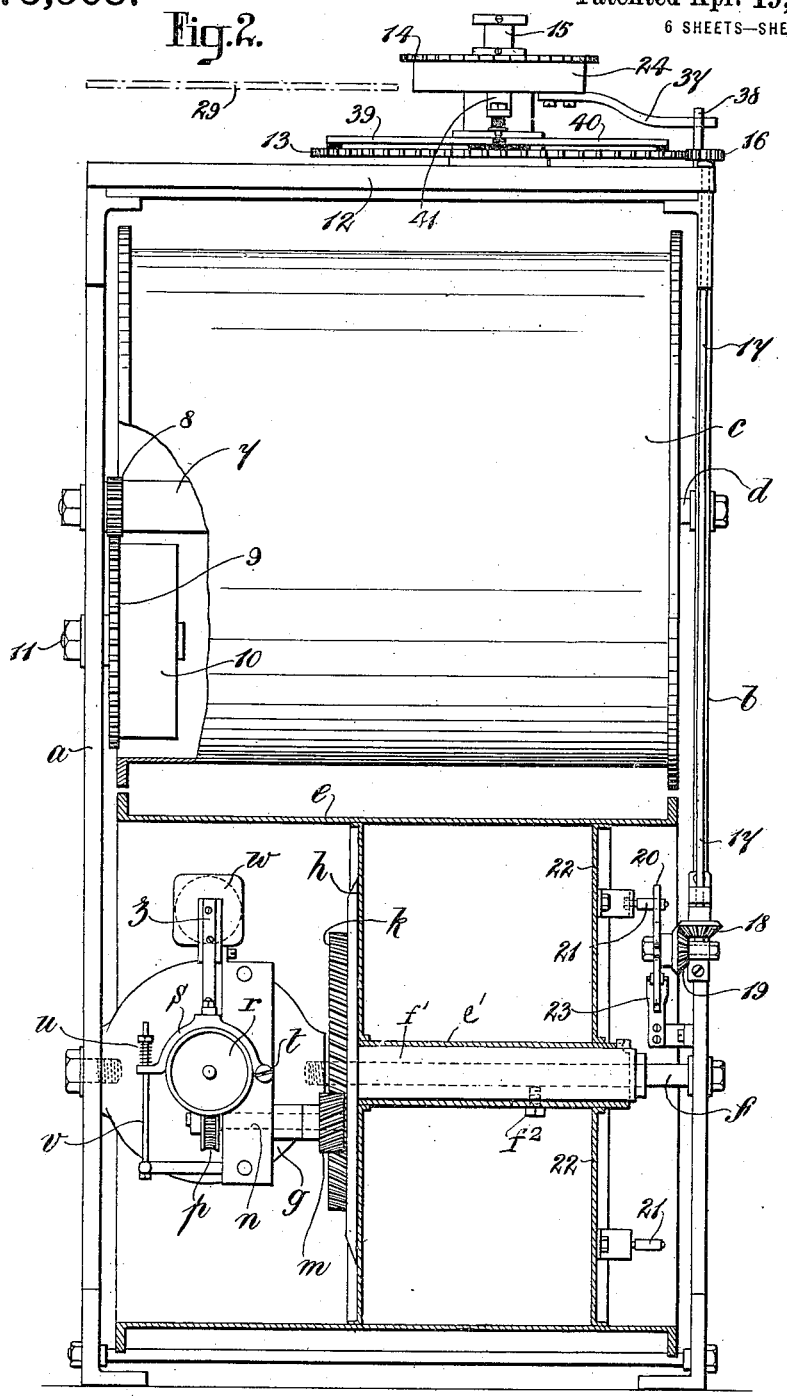
Fig. 2 shows front elevation of the same, parts being shown in section.
Figure 21:
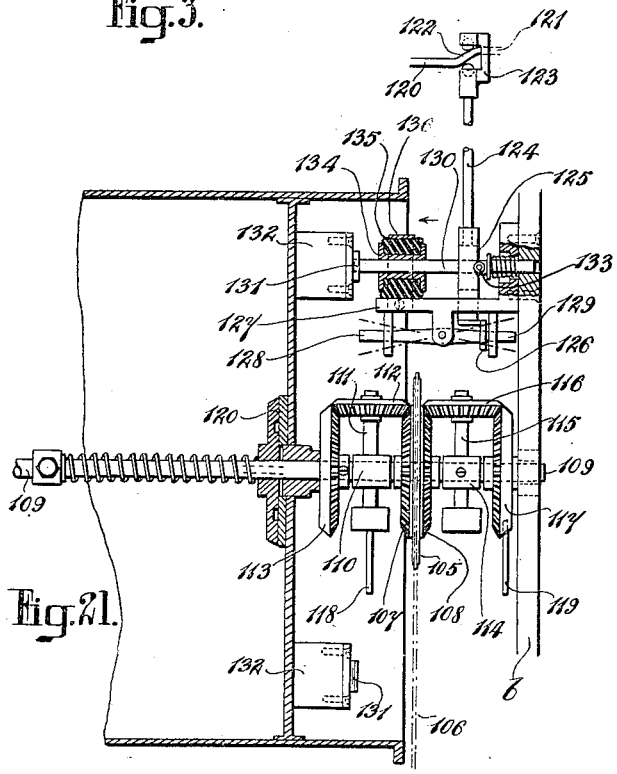

Fig. 21 shows sectional side elevation of one method of controlling the advertising unit by mechanical means;

Fig. 22 is a detail of the structure shown in Fig. 2.

Figure 1:
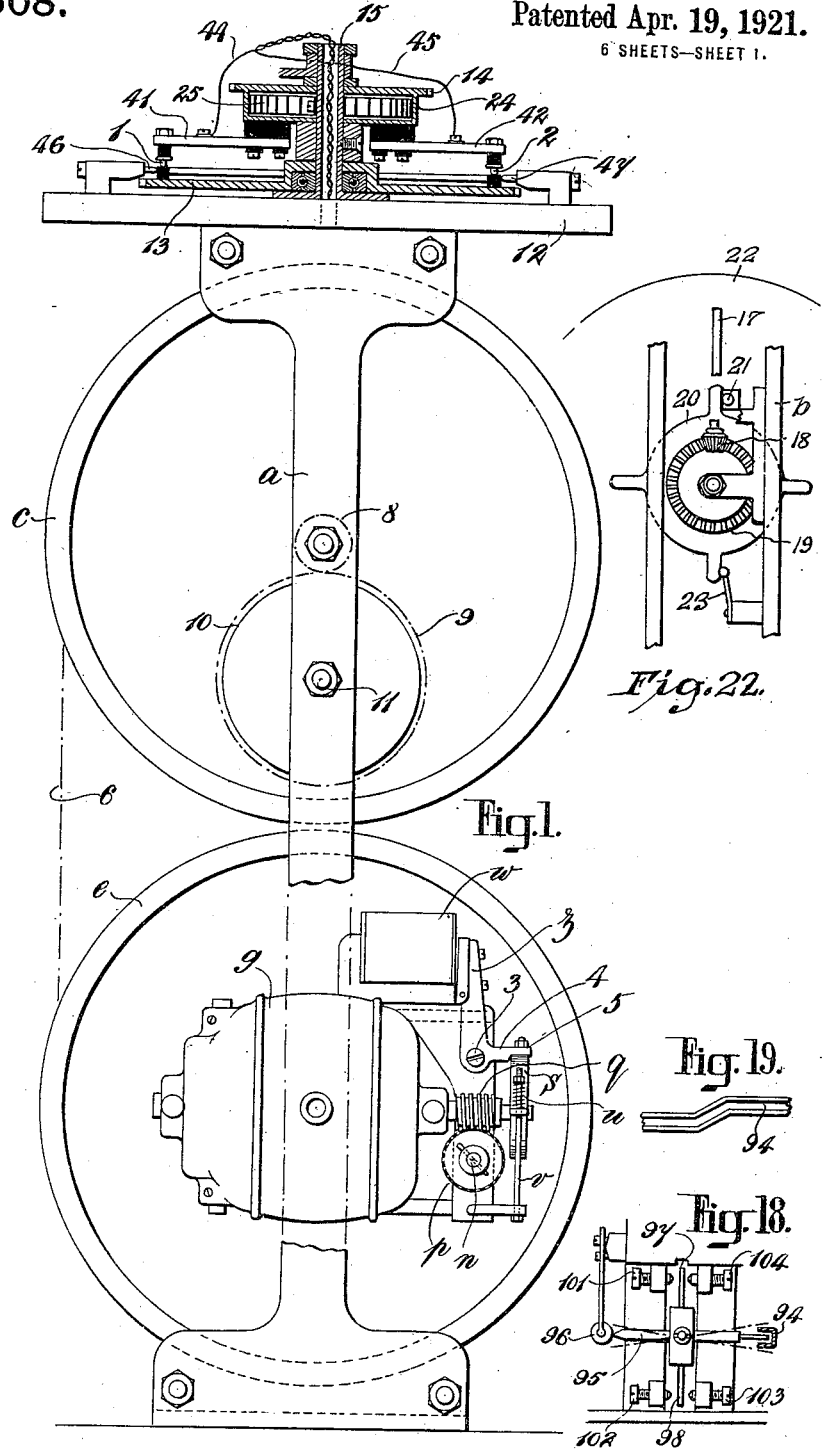
Figure 1 shows a side elevation of a portion of one form of an advertising unit having combined therewith one form of my selector shown in section.
Figure 3:
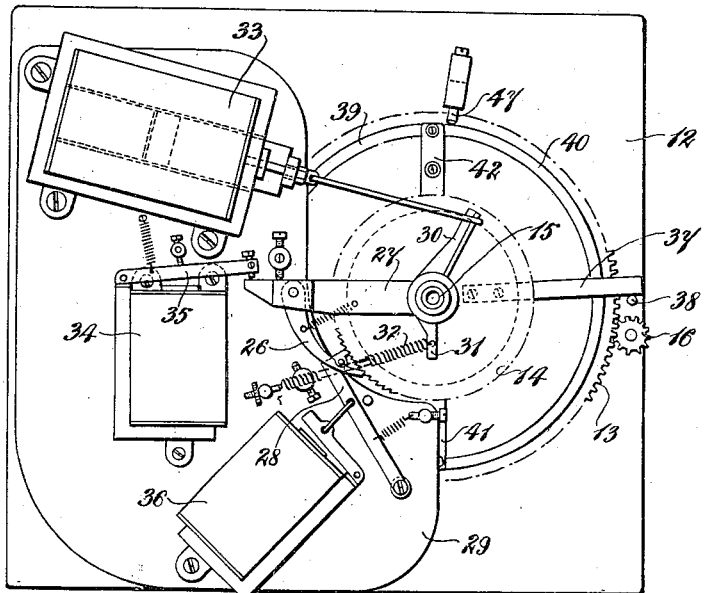
Fig. 3 shows plan of the mechanism for actuating the selector the same mechanism being omitted from Figs. 1 and 2 for the sake of clearness.

Referring to the first form of my invention, as shown in Figs. 1 to 13 more especially with reference to Figs. 1 to 3, the advertising device to which my invention is adapted, and of which in this particular case it forms a part consists of a number of units, each carrying a band which is wound between two rollers, exhibiting according to the degree of winding, a letter, numeral, symbol sentence part of a picture or the like, which it is desired to exhibit, preferably a number of letter units are arranged together, so that a coherent announcement may be made, or in some cases each band may contain some portion of a picture or the like a block of units being then employed to present a complete picture. In general it is obvious that this unit system can be utilized in many ways and for many purposes.

In the form shown, each unit comprises side frames $a$ and $b$ connected together by suitable distance pieces. $c$ is a drum or like construction capable of being rotated on a fixed spindle $d$, ball bearings being preferably employed. $e$ is another drum, similar on the exterior to the drum $c$. $f$ is a spindle fixed at one end of the frame $b$ and at the other end in the casing of a small electromotor $g$. Upon this spindle a sleeve $f^1$ is suitably mounted carrying a disk $h$, and upon this sleeve $f^1$ is received another sleeve $e^1$ forming part of the drum $e$, and the two are locked together by a clamping screw $f^2$.

The motor $g$ is fixed by a suitable screw to the side frame $a$. The plate $h$ carries a helical gear wheel $k$, with which meshes a correspondingly cut pinion $m$. The pinion $m$ is carried on a counter shaft $n$ working in suitable bearings and also having keyed thereto a worm wheel $p$, which meshes with the worm $q$ mounted upon the shaft of the motor $g$. The same shaft that carries the worm wheel $q$ is extended and has in this form fixed thereon a brake drum $r$. $s$ is a saddle or shoe pivoted at $t$ which when no current is passing through the motor $g$ is pressed down upon the brake drum $r$ by means of a compression spring $u$ upon a fixed rod $v$ suitably fixed to the casing of the motor. $w$ is an electromagnet the armature $z$ of which is pivoted at 3 and formed with a bent arm 4 loosely attached to the top of the shoe or saddle at 5 a sufficient clearance being given to the attachment to allow the following action to take place:—

When the current passes around the electromagnet $w$ the armature $z$ is attracted and lifts up the shoe or saddle 5 from the brake drum $r$ against the action of the spring $u$.

The windings of the magnet $w$ are so connected to the windings of the motor that when the motor is running the magnet is energized and thus no braking action takes place upon the drum $r$, but when however the current is cut off from the motor it is also cut off from the electromagnet; this allows the spring $u$ to force the shoe or saddle $s$ upon the brake drum $r$ and thus instantaneously or at least very quickly stop the motor directly the current is cut off therefrom, and practically prevents any turning movement of the drum taking place due to the momentum of the rotating parts in the motor. In some cases I may combine with this brake mechanism a locking movement such as that hereafter described, all operated by the same magnet.

The motor $g$ as will be readily understood, when it is running causes the drum $e$ to turn in the required direction. As the two drums are connected together by the band 6 the drum $c$ is also caused to turn. This drum $c$ is provided with a sleeve 7 which forms the part running around the fixed spindle $d$. This sleeve 7 has fixed thereto a pinion 8 gearing with a gear wheel 9 attached to a spring barrel 10 rotating upon a fixed axle 11, fixed to the side frame $a$. One end of the spring in the spring barrel 10 is fastened to the fixed axle 11 and the other end of the spring to the interior of the barrel. When the motor $g$ is turned in such a direction as to cause the band 6 to move downward, the spring in the barrel is wound up and consequently when the motor turns in the opposite direction the spring in unwinding winds the band 6 back on the drum $c$.

The direction in which the motor is caused to turn is controlled by the selector mechanism about to be described.

Mounted upon the platform 12 coming at the top of the unit are two wheels 13 and 14 supported in this instance on the same hollow spindle 15. The lower wheel 13 is driven in unison with the drum driving mechanism. The wheel 13 is operated at each half revolution of the drums or otherwise as may be arranged according to the particular machine. As shown the wheel 13 is driven forward or backward according to the rotation of the drum by means of a pinion gearing with it and mounted upon a vertical shaft 17 supported in suitable bearings on the frame and having at its lower end a bevel wheel 18 gearing with another bevel wheel 19, which latter has fixed thereto a star wheel 20. The shaft supporting the wheel 19 is fixed to the frame $b$. The teeth on the wheel 20 are adapted to be engaged by pins, rollers or the like 21 projecting from the side 22 of the drum $e$. The two pins or rollers 21 are provided spaced 180° apart so that the mechanism is operated every half revolution. The star wheel 20 is held at each step by a spring roller 23. The wheel 13 above described since it counts the number of steps made by the band, I will call a counter wheel. The other wheel 14 is provided in this case with ratchet teeth and has formed therewith a spring barrel 24, the spring 25 therein being mounted with one end fixed to the spindle 15 and the other to the spring barrel 24. This wheel known as "the selector wheel" is provided with ratchet teeth engaged by a single pawl 26 pivotally mounted in an arm 27, which arm 27 has its bearings on the hollow spindle 15. The pawl 26 is kept pulled into engagement with the teeth of the ratchet by means of a suitable tension spring. The spring 25 in the barrel 24 is so fixed that when the pawl 26 is fed forward it winds up the said spring. 28 is a rocking arm formed at the end with a nose engaging with the teeth of the wheel 14 and kept pulled against the said teeth by means of a suitable tension spring. This arm constitutes a spring click or catch which holds the ratchet wheel 14 from returning when fed forward by the pawl 26. 29 is an upper platform located as shown in Figs. 2 and 3 upon which the most of the mechanism just described and about to be described is mounted.

The arm 27 which works around the spindle 15 has formed therewith two arms 30 and 31, the arm 31 having connected thereto one end of a tension spring 32 the other end being adjustably fixed to a suitable support upon the platform 29. The arm 30 is connected to the core of a solenoid 33. 34 is a magnet mounted upon the platform 29 the armature 35 of which has an adjustable projecting screw mounted at the end thereof which normally takes against the end of the arm 27. The solenoid 33 and the magnet 34 are for actuating the feed pawl of the ratchet and the parts are so arranged and the distance so calculated that when the current passes around the electromagnet 34 the arm 27 is forced forward causing the wheel 14 to be moved through the distance of one tooth, while when the current is supplied to the solenoid 33 the arm 30 is pulled, causing the arm 27 to carry around the pawl 26 and move the ratchet 14 through the arranged multiple of one, say four teeth, suitable stops being located on the platform 29 for these movements to take place with certainty. If the magnet 34 and solenoid 33 are arranged in the same circuit, when a weak current is sent, it only sufficiently actuates the electro-magnet and causes the wheel 14 to move through one tooth, while if a strong current is sent it actuates both the solenoid and the magnet simultaneously and moves the ratchet wheel as previously explained through four teeth.

36 is another electro-magnet connected to the arm 28. When this electromagnet is energized the detaining catch is removed from the wheel 14 and a projecting pin on the arm at the same time comes into contact with the pawl 26 and disengages this from the teeth of the ratchet wheel thus leaving the ratchet wheel quite free. In this position it can move back to its original position under the action of the spring 25. It will be understood that by operating the solenoid and the magnet, the wheel 14 may be set forward through the desired number of steps very quickly. The magnets may be connected in series or parallel as may be found best suited to the particular machine and combinations.

The selector wheel 14 carries an arm 37 which when the selector is in the zero position, Fig. 3 ready for resetting, comes against a stop 38 projecting from the base 12. The wheel 13 carries upon insulating blocks thereon, two conducting segments 39 and 40 insulated from one another. 41 and 42 are two arms attached beneath the spring barrel 24 but insulated therefrom. These arms come diametrically opposite and carry at the ends thereof spring brushes 1 and 2 in connection with the leads 44 and 45 to the motor $g$. These spring brushes bear upon the tops of the conducting segments. 46 and 47 are other spring conducting brushes mounted in suitable holders upon the platform 12 and insulated from one another. These spring brushes come in diametrically opposite positions and are so disposed that when the mechanism is in the zero position one of the brushes is in electrical contact with the segment 39, while the other is in contact with the segment 40. In this same position however, the two spring brushes 1 and 2 are upon the insulated portions coming between the two segments 39 and 40.

Figure 4:
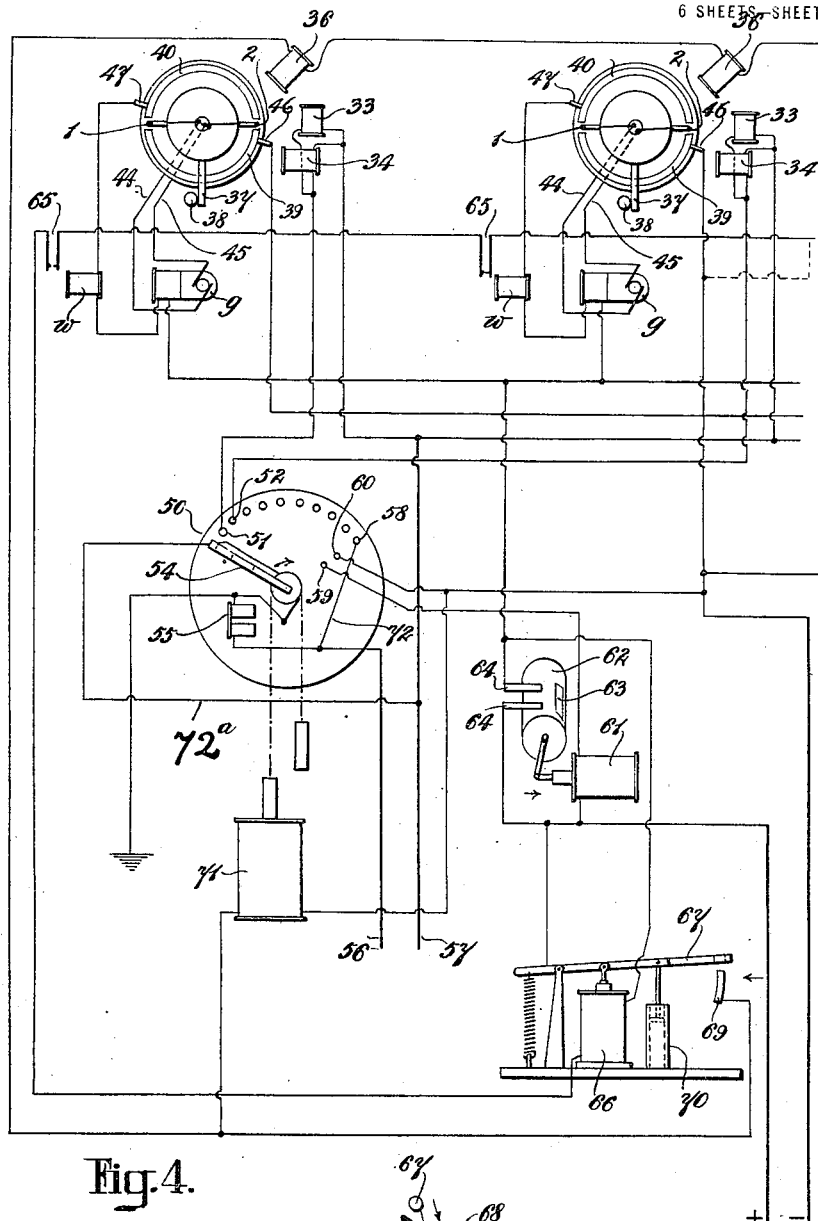
Fig. 4 shows diagram of connections for use with the form of selector shown at Figs. 1 to 3 the said diagram including the connection for two advertising or other units with their selectors and the transmitting apparatus.

As previously explained the spring brushes 1 and 2 are electrically connected to the ends of the armature of the motor and the brushes 47 and 46 are connected one with the field and the other with one pole of the supply current, the connection to the field having the brake magnet $w$ or locking magnet, when such is employed in the circuit. These connections are shown at Fig. 4, and when the circuit is completed, according to the relative positions of the selector wheel brushes and the segments the direction of rotation of the motor is determined, as it will be seen that this controls the direction of flow of the current through the armature, the current through the field always remaining the same. This and the action of the selector will be further explained with reference to the diagrams Figs. 6 to 13.

Figure 6:
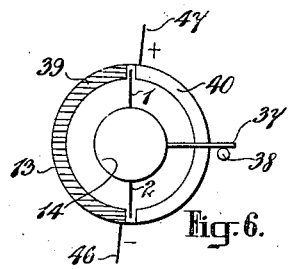
Figure 7:
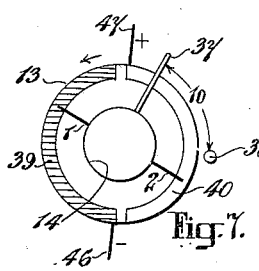

The position shown at Fig. 6 is the position when all the parts are at zero, that is to say the arm 37 is against the stop 38 and the brushes 1 and 2 are on the insulated portions coming between the segments 39 and 40. In this position no indication is being exhibited by the unit. Say now it is desired to exhibit the indication corresponding to 10 impulses. Impulses are sent to the solenoid 33 and the magnet 34 to move the selector wheel 14 through a distance corresponding to 10 teeth. This brings the parts to the position shown at Fig. 7 where it will be seen that the arm 37 has been moved a distance of 10 teeth from the stop 38, and consequently the spring brush 1 has been moved a similar distance and is in electric connection with the shaded segment 39 connected to the negative brush 46 while the brush 2 is in connection with the plain segment connected to the positive brush 47. When the motor in the unit is started, in the manner to be hereinafter explained, the current passes through the armature in a certain direction which causes the wheel 13 controlling the movement of the segments 39 and 40 to be turned in the direction of the arrow 48. It should be explained that the gearing of the parts is such, in this form that with a complete winding of the band the gear wheel 13 only moves through an angular distance slightly less than a semi-circle, so that the brushes 46 and 47 are never in contact with the insulated portions between the segments.

Figure 8:
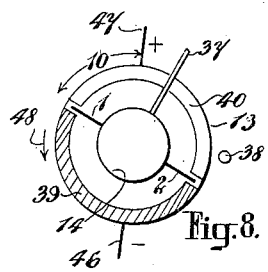

This action continues until the insulated portions between the two segments come beneath the spring brushes 1 and 2 in their new position thus breaking the circuit through the motor and causing the motor to stop. The position the parts have now assumed is shown at Fig. 8 and the desired indication is being shown in the unit. When the current is sent to the magnet 36 of this particular unit, the pawl and spring catch are removed from the ratchet wheel 14 and the selector springs back to its original position, that is moves backward until the arm 37 again comes into contact with the stop 38. This position is shown at Fig. 9 and it will be seen that the brush 1 is now in electric connection with the energized magnet, while the brush 2 is in connection with the deënergized magnet.

Figure 10:
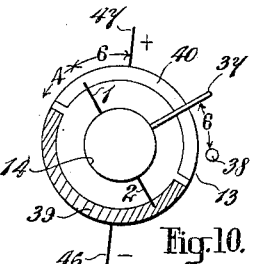
Figure 11:
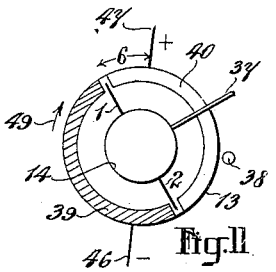

Should it be desired to set the unit so that the indication represented by six single impulses is set in the exhibiting position, it is simply necessary to send the required number of impulses to the solenoid 33 and the electromagnet 34, to bring the selector in the required position, as is shown at Fig. 10. Upon starting the motor it will be seen that the direction of the current is reversed from that shown in Fig. 7 and consequently the motor runs in the opposite direction, causing the wheel 13 controlling the movements of the segments to turn in the opposite direction, that is to say in the direction of the arrow 49 until the insulated portions between the segments come beneath the brushes 1 and 2, when the motor is stopped and the required indication is in the exhibiting position. In effect it will be seen that the exhibiting band has simply been moved back through four indications, the nearest path from the previously exhibited indication to the desired one.

Figure 9:
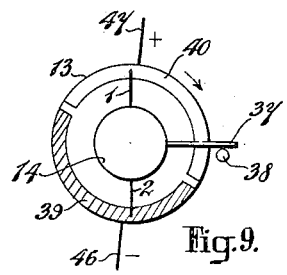
Figure 12:
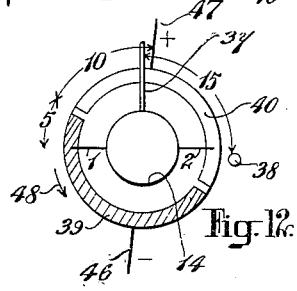

Taking the position from Fig. 9, should it be desired to set a fresh indication corresponding to more impulses than the previous one, say 15 the required impulses are sent to the selector operating the controlling solenoid and electromagnet and the selector is moved around through a distance corresponding to 15 teeth. This is shown at Fig. 12 where it will be seen that the segment in connection with the negative lead is again in connection with the spring brush 1 and the positive lead is in connection with the spring brush 2.

Figure 13:
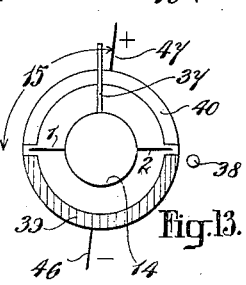

When the motor is started the direction of rotation will be the same as that in the case first under consideration, that is in the direction of the arrow 48 and therefore the wheel 13 will turn until it brings the insulated portions between the segments under the brushes 1 and 2, that is to the position shown at Fig. 13, when the required indication is being exhibited in the unit.

Figure 5:
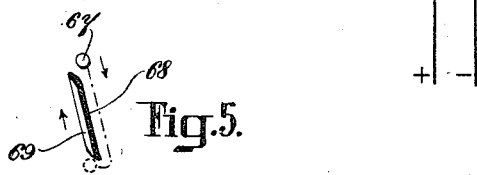
Fig. 5 shows a detail of the switching apparatus.

Referring now to the diagrams shown at Figs. 4 and 5, which illustrate the whole system, two units however, being only shown in detail, 50 is a unit selecting switch provided with contacts 51, 52, etc. 54 is a conducting arm which moves over this series of contacts and switches into the operative circuit the particular unit connected to the said contact. This conducting arm is arranged to be moved in the direction of the arrow shown in Fig. 4, by suitable spring or other means (not shown), and is releasably held against movement by suitable escapement mechanism (not shown) arranged when released, to permit the arm to move from one contact to the next. 55 is the electro-magnet which controls the movement of the said arm, that is to say when an impulse is sent to the electro-magnet the escapement-controlling arm 54 is released and the arm is permitted to move through the action of its operating mechanism from one contact to the next in the direction of the arrow.

Suppose an impulse is sent over the line 56, this operates the magnet 55 and by releasing the escapement controlling the arm 54, causes the arm 54 to move on to the contact 51. The arm 54 being connected to earth and the contact plate 51 to the solenoid 33 and magnet 34 to the first selector, the operating circuit is now complete to the unit. Say it is desired to set the ratchet wheel 14 to the unit through 7 teeth, one strong impulse is sent over the line 57 which operates both magnets and causes the ratchet wheel 14 to be driven forward four teeth and three weak impulses are then sent which operate the magnet 34 and cause the wheel 14 to be set three more teeth. It will be understood that current passing over the line through the magnets returns through the arm 54 to earth and so back to the source of power at the transmitting station. In this way the selector in the first unit is set in position.

The lines 56 and 57 are again energized and cause the arm 54 to move upon the next contact 52 when the selector wheel in the next unit is set through the desired number of teeth and so on throughout the whole of the series of units after which the arm is moved on to the last contact 58. When the arm rests here a short plate on the under side thereof connects the two contacts 59 and 60 together. This completes the circuit from the positive pole of supply through the solenoid 61, through the contacts 59 and 60 and back to the negative line. The energizing of the solenoid causes the turn over switch 62 to bring the contact plate 63 beneath the contacts 64. This switches on the supply current from the positive pole through the common line to the fields of all the motors $g$, thence through the brake magnets $w$ to the spring brush 47 bearing upon the outside of the segment 40 from the segment 40 to whichever brush (1 or 2) comes upon its surface, to the armature of the motor, back from the armature to the other brush (2 or 1) to the segment 39, thence through the lower brush 46 to the common line and back to the negative pole of the supply.

By this operation all motors are caused to run in whichever direction the current passes through them and continue to run until the insulated portions between the various segments 39 and 40 come beneath spring brushes carried by the selectors. This stops the motors and as will be understood from the previous explanation with reference to Figs. 6 to 13. In this position the drums are brought to rest with the required indications on the bands in the exhibiting positions. The operation of the said indications is thus completed, but the selectors have yet to be returned to their zero stops ready for resetting.

This is accomplished as follows:—

When the current is switched off the respective motors, a set of contacts 65 and $65^1$, etc., so arranged that they are operated by the brake magnets $w$ are closed. These contacts are connected together in series and one end of the line is connected to the negative pole of the supply and the other end through the windings of a relay, solenoid 66 to the positive pole of the supply through the motor switch contacts 63 and 64. When the circuit is completed the relay is operated. This is so arranged that the relay arm 67 does not make contact on the downward movement, but on the said downward movement passes over an insulated portion 68, see Fig. 5. When it gets to the bottom of the stroke, however, the contact is closed and continues on the upward movement during which time it is in contact with the conducting plate 69, the insulated portion and conducting plate being formed in one and suitably supported so as to come into the path of travel of the said arm. 70 is a dashpot in which a plunger, connected to the arm 67 works, the said dashpot being of such character that a quick movement is allowed on the downward stroke and a slow movement on the upward stroke. The relay arm on reaching the bottom of its downward stroke closes two circuits as it will be seen that the arm is connected to the positive pole of the supply and the current passes along the arm to the contact plate 69 thence to the solenoid 71 of the unit switching device 50 which it energizes, and thus causes the return of the arm 54 to its original position, that is the position shown on the drawing. From the solenoid 71 it passes back to the negative pole of the supply.

The other circuit, which the relay closes is that of the selector release magnets 36 the current passing from the positive pole of the supply through the arm 67 to the plate 69 through the magnets 36, thence back to the negative line. Thus when the relay makes contact all the selectors are moved back to zero. As the arm of the unit switching selector 50 is returned, it releases and therefore, breaks the circuit of the hold down motor switch 62 at the contact studs. This then goes out of action, and at the same time it breaks the circuit of the relay magnet, the arm of which returns slowly however, under the action of the dashpot (or other retaining device) which gives time for the magnets and solenoids of all the different selectors to act; the last part of the stroke of the relay arm acts quickly giving a sudden break. It will be observed that there are two loop lines 72 and $72^1$ connected from the two line wires 56 and 57 to the first and last contact studs or plates of the unit switching selector. When these are employed it is usually for the purpose of allowing a signal to be transmitted to the control station showing that the cycle of operations has been completed and locking means may be added for locking the transmitter when resting on the last contact 58 and so preventing further transmission until the cycle of operations is complete.

When currents of two strengths are used, for setting the selectors by multiple or single step the line 57 may if desired be relayed when the system can be worked from the transmitting station, operating strong and weak currents which work the magnets as before described.

Although I have shown the selectors in the form of wheels coöperating with other wheels forming the counting elements, as previously stated these parts may take other forms such as bars, racks, arms, quadrants or the like.

In place of the reversal of the motor being effected directly by the motor current passing through segments and brushes, on the counting and selecting wheels, there may be a reversing switch, preferably carried on one of the wheels, and operated by the other, or there may be a separate magnetic switch on the frame operated by a contact or contacts, brought about by the selector or counting wheels. The relative position of the parts will then determine as before the running direction of the motor and the stopping position.

This may be accomplished in various ways one of which is shown at Figs. 14–16. At Fig. 15 the counting wheel 13 has mounted thereon a rotary switch 73, shown in side elevation at Fig. 16. This consists of a drum of insulating material carrying conducting segments 74, 75, 76, 77, 78, 79, arranged and connected as shown on the drawing. The wheel 13 also carries an insulating block, having fitted thereon four spring controlled contact brushes 80 only one of which is shown adapted to come into contact with the connecting plates of the switch. The selector wheel in this case carries one spring contact 81 adapted in the zero position to come on the insulated gap between the ends of a conducting ring 82 or the same effect might be produced by providing the contact such for instance as 88 mounted on one of the wheels and broken by a rib or the like on the other at the stopping position. 83 is an arm with a projecting pin, projecting from the selector wheel 14, so arranged that when it passes the switch 73, it engages in a slot therein or with pins or lugs thereon and causes the reversal.

It will be seen from the drawings that when the spring contact 81 comes to the insulated portion, the switch remains in the position in which it was last set.

The advantage of this arrangement is that two circuits may be used for driving the motor. The current is not broken on the selector switch but is broken on a contact on the driven mechanism, which enables the correct stopping position of the exhibiting unit to be insured. The one circuit is a shunt to the other, as shown in the diagram Fig. 14. The first circuit is broken at a single contact at the selector stopping position as previously described.

The action of this device will be readily understood bearing in mind the explanation of the system previously described.

The selector having been set as explained in the first system has caused the contact 81 to come into electrical connection with the ring 82 the switch 73 being in the position required to wind back the switch arm 81 to its normal position. Now as soon as the common motor starting switch in connection with the unit switching selector is closed as before and the current switched on to the motor, the motor lock magnet or solenoid $83^1$, see Fig. 14 will act.

This causes this locking mechanism to be released.

The construction of the locking mechanism which is to take the place of the brake S and solenoid W is clearly seen from the enlarged details shown at Figs. 14 and 17.

84 is a catch adapted to enter a hole or slot in the driven part, in the present case in an internal flange 85 on one of the rotating web drums. 86 is a roller or ball carried on the movable part of the core of the solenoid, and when this solenoid is energized the roller or ball 86 is withdrawn from a cam surface 87 forming a depression in the path upon which the ball or roller rolls, and the catch is released. 90 is a flat spring with an aperture therein through which the rod 91, in connection with the core of the solenoid $83^1$ passes. It will be seen that the insulated boss on the end of the plunger rod of the magnet comes behind the spring 90 which is shown in section and again in plan at Fig. 17. One end of this spring, which in this construction would be non-magnetic so as not to be attracted by the magnet, is coupled to a pillar 92 and the other end has a platinum contact which closes with the contact screw 93 on the other pillar, also shown. The center of the spring has a hole or slot through which the rod of the magnetic plunger or the movable core passes. The pillars which support this spring are screwed into the holes provided on the lugs at the back end of the saddle that supports the movement. The locking mechanism may be applied to any moving part in connection with the controlled mechanism.

When the solenoid is energized the drum is set free and the current switched on to the motor, through the contact 88, and the motor will be driven, the current passing from the positive pole of the battery through the motor switch 62, thence by two parallel circuits the one through the contact 81 on the counting wheel, the other through the contact 88 on the locking device. The former is arranged to break first, somewhere within a step before the second contact is broken (the feed of the counting wheel being preferably intermittent, step by step) so that the machine is stopped before the counting wheel 13 is again disturbed, that is to say when the machine comes to the setting position, the contact 81 has previously come to the set position.

The winding of the magnet or solenoid $83^1$ is in the circuit of the contact 81 and therefore the core or armature ceases to be attracted and to hold the catch 84 and the roller 86. The said roller 86 therefore runs upon the straight portion of the flange 85, being forced back on to it by the spring, and the flange causes the contact 88 to remain unbroken until such time as the roller 86 rolls into the declivity 87, when the contact 88 is broken.

When the catch and the roller drop into their recesses, the last contact is broken stopping the motor. There is a resistance 89 in the locking circuit, which slows up the motor after the first contact has been broken and brings up a gentle stop. Moreover this resistance forms a counter to the resistance of the magnet or solenoid $83^1$ in its parallel circuit.

In an alternative arrangement of these two circuits, the second or locking circuit can be closed when or just before, the first (the selector and magnet winding) is broken.

Figs. 18 and 19 show another form of mechanically operated reversing switch which may be advantageously used for small parts where it is desired to reduce the amount of work to be done by the moving parts of the selector mechanism to a minimum for effecting the operation of the switching.

94 is a groove on the periphery of one of the wheels: on that of the selector wheel when the blocks carrying the contacts and switch arm are mounted on the counter wheel or if the switch be mounted on the selector wheel then it may be on the counter wheel. It will be seen from Fig. 19 that this slot has an incline formed therein for the purpose hereinafter mentioned. 95 is a pivoted lever furnished at one end with a pin which is adapted to enter the slot 94 and provided at the opposite end with a pointed extension coming into contact with a roller 96 carried at the end of a spring arm screwed to the casing. The pivoted lever is also provided with two contact blades 97 and 98 which are insulated from one another and connected to the two brushes of the armature of the motor and which, when the pivoted lever 95 is swung over on one side is adapted to close with the contacts 101 and 103 while when it is swung over the opposite side they close with the contacts 102 and 104. Contact screws 102 and 101, 103 and 104 are respectively on the same blocks, and each block insulated from the other. The position shown in Fig. 18 is that in which the pin at the end of the lever 95 is just passing up one of the inclined portions of the slot 94 in the middle of a reversal, and it will be seen that according to which direction the operating wheel is moving so the lever 95 will be swung over to one side or the other, putting the contact blades 97 and 98 into contact with their appropriate terminals. The roller 96 holds the lever arm 95 in position until the operating wheel reverses the movement. It will of course be understood that the circuits are suitably connected to the terminals 102, and 101, 103 and 104 for effecting the necessary results.

In some forms of selectors, it is necessary to provide an additional locking means for the selector wheel so as to prevent the said wheel being moved when the counting wheel 13 is being set in unison with the movement of the exhibiting band. One form of this device is shown at Fig. 20 where the lower portion of the spring drum 24 has fitted thereto a wheel 104. The teeth of the said wheel are square or otherwise suitably shaped. 105 is an electromagnet the armature of which controls a sliding spring controlled plunger 106. The front of this plunger is adapted to come into firm engagement with one of the teeth of the wheel 104 when the magnet 105 is energized. The said magnet is therefore included in the circuit of the motor of the unit, so that when the motor is running and the wheel 13 is being rotated the nose on the end of the plunger 106 is in engagement with the wheel 104 and thus the selector wheel 14 is held firmly against any unintentional turning. This device may be fixed on the frame or on the counting wheel according to the locking movement required for the particular combination.

The self calculating selector such as has been described more particularly in the system shown at Figs. 1–3 and which may be arranged in several forms may also be worked mechanically for the driving of the units from one source of power, for instance with one motor for a number of units. In one form arranged according to this system I couple the drums or other driven part to a driving power by a differential gear. The arrangement of the driving parts is as follows:—

105 is a wheel having teeth to take a sprocket chain 106, which may be driven by a common shaft below or at the back of the unit or it may have gear teeth or be driven by a band. This wheel 105 has on either side bevel teeth 107 and 108 both of which are driven with the chain sprocket 105. This sprocket wheel with bevel wheels on each side is mounted loosely upon a shaft 109. 110 is a sleeve mounted loosely upon the shaft carrying another shaft 111 at right angles to the shaft 109 and having mounted on its end so as to be free to turn thereon a beveled pinion 112 which meshes with teeth of the bevel 107. 113 is a bevel wheel screwed, keyed or pinned to the shaft 109 and of the same size as the bevel 107. This also meshes with the bevel pinion 112. 114 is another sleeve mounted on the shaft 109 and in this case screwed thereto. This sleeve carries another shaft 115 which comes at right angles to the shaft 109 and has mounted on the end thereof another bevel pinion 116 free to turn thereon. This bevel pinion gears with the bevel 108. 117 is another bevel wheel mounted loosely around the shaft 109 and of a size similar to the bevel 108. The sleeves 110 and 114 have on the diametrically opposite sides to the wheels 112 and 116 counter weights. 118 is a projecting pin or rod from the counter weight of the wheel 112 and 119 is a similar projecting pin or rod projecting from the periphery of the wheel 117. The shaft 109 may be connected to the drum by a friction coupling 120 so as to turn therewith and yet be thrown out of gear when required without shock. Supposing the chain wheel 105 be driven in a constant direction, if the pin or rod 118 was prevented rotating around the shaft 109 it will be evident that the gearing 107, 112, 113 will cause the shaft 109 and consequently the drum to be driven in one direction the other gears running loose. If the pin or rod 119 is held against rotation then the sprocket 105 still running in the same direction as before will cause the pinion 116 to roll around the teeth of the wheel 117 and carry its sleeve with it and thereby cause the shaft 109 to be rotated in the reverse direction to its previous rotation.

The method of holding either of the pins or rods will now be described.

The counting wheel 13 controls the movement of a wheel with a flange 10, part of which is shown at the top of Fig. 21. This flange has portions coming on to levels namely 120 on a low level and 121 on a high level. At one position on the circumference these portions are connected by a sloping portion 122. 123 is a guide working over the flange provided with running surfaces of two balls. This guide is connected to a vertically moving rod 124 formed toward the bottom with a cam surface 125 having a recess therein and carrying at the extreme end a hook 126. 127 is a bracket projecting from the side frame $b$ and having pivoted in a downward extension thereof a rocking lever having two arms 128 and 129. This rocking lever can take up any of three positions, as shown in full lines occupying a neutral position when each arm is clear of the projecting pin or rod 118 or 119, or rocked up or down in either direction. The action of this part will be readily understood:—

Say the counting wheel is rotated in one direction, the guide 123 will either ride down to the lower surface 120 or ride up to the higher surface 121 according to the direction of rotation. This will either lower the arm 129 into the path of the pin 119 and prevent its rotation or else lower the arm 128 to the path of the pin 118 and prevent its rotation thus according to the setting of the flange either in the higher or lower position so that the drum will be driven in one or other direction. 130 is a spring rod normally tending to move in the direction of the arrow and to engage in notches 131 carried by blocks 132 attached to an internal flange in the drum. This spring rod is provided with a roller 133 which rides upon the cam surface 125. When the position is such that the roller rests within the recess then the end of the rod is in engagement with one of the slots or recesses 131 and the drum is prevented from turning. This is the neutral position. When however the rod 124 either moves up or down, the roller 133 is forced inward against the action of the compression spring and the nose is withdrawn from the notch 131 leaving the drum free to be rotated. The rod slides through a bearing 134 surrounded by a rubber block or sleeve 135 held in position by a metal strap 136 attached to the sides of the bracket 137.

This arrangement is provided for taking up the impact between the approaching stop and the end of the rod 130.

The action is as follows:—

When the flange controlled by the counter wheel has come around so that the guide 123 comes to the neutral position and consequently the rod 130 has moved in the direction of the arrow, then a certain amount of impact takes place between the next approaching stop carried by the block 132 and the end of the rod projecting in its path although a beveled incline is provided for minimizing this. The rubber cushion around the guideway takes up this shock and prevents jarring and shifting of the mechanism.

Where the means for cutting out the driving motor is associated with the counter, the counter when being driven by the unit must move independently of the selector, in order that the said cutting out mechanism shall be brought into the correct relative position to the stopping position of the selector, when the latter is set back preparatory to making a fresh setting.

On the other hand when the device for cutting out the drive is connected to the selector, the selector must move with the counter so that the cutting out device shall come into operation and stop the drive in the correct position, the selector then being disengaged and returning to its stop.

It will be understood that the positions of the stops, the switch, the arrangement of pawls and other details may be varied in many ways.

In place of setting a selector mounted on the exhibiting or equivalent unit from a distance electrically and driving it mechanically from the unit, the selector can be placed at a distance from the unit and connected to it electrically so that the selector is returned electrically step by step with each step of the exhibiting unit.

In the same way if the selector is set by hand, instead of sending impulses by hand to set it, and is returned electrically the selector then becomes a hand transmitter.

As before remarked the self-calculating selector may be used to set a jacquard step by step in connection with a unit for bringing about the desired indication.

In general it will be understood that any combination of parts for controlling advertising or other mechanisms in which the setting and stopping means and the reversing means are combined so that it is only necessary to effect a single setting in the selecting or transmitting part in order to enable the controlled device to proceed directly from one setting to the next required, is included in the principle of my invention.

It is to be noted that where the automatically operating selective mechanism is located entirely at the exhibiting station it is only necessary to transmit the standard number of impulses to the transmitting station in order to bring a particular indication into position, irrespective of the indication already in position. Where the selector mechanism is located at a transmitting station it is more convenient to transmit only the required number of impulses to bring the exhibiting element to the required position and to operate the reversing means, and that my present invention enables either procedure to be followed.

What I claim and desire to secure by Letters Patent of the United States of America is:—

1. In an advertising device, a movable element adapted to be brought into any one of a series of positions, means for operating the same, and a setting and direction determining mechanism, said mechanism including a movable selector member adapted to be moved away from a fixed stop to determine the position to be taken by the movable element, a movable counter member displaceable with respect to the selector member and movable in unison with the said element, set in position by the selector member, means for throwing the operating means out of action when the element comes in position, and means for reversing the direction of movement of said element, whereby the element is moved in one direction when the selector member moves the greater distance and in the other direction when it moves a less distance.

2. In an advertising or like device comprising a unit or plurality of units, each provided with mechanism for bringing advertising or equivalent elements successively into position: the combination of driving means for driving the said mechanism, a part or means adapted to be set in position for determining the advertising or equivalent element to be brought into the exhibiting or other required position, means for starting the driving mechanism, means for stopping the driving mechanism and means for reversing the driving mechanism, the part or means for setting and means for stopping mechanism being so displaceable with respect to one another that when the mechanism comes to rest with the required advertising or equivalent element in the desired position, the displacement between the said setting and stopping means or parts bears a proportional relation to the number of steps or distance between the element then in position and the first element or the zero position of the series of elements, so that when the next setting is effected the mechanism automatically takes into account the position of the exhibiting element or equivalent part and operates the reversing means if necessary, and the said exhibiting or other unit proceeds directly from the last setting to the next required.

3. An advertising device of the type provided with a number of units each containing mechanism for bringing bands, cards, plates, disks or their equivalents successively into position and combined with electrical selector mechanism for denoting the particular indication or the like to be exhibited, wherein the selector mechanism comprises in combination a part which is adapted to be set into a position to determine the corresponding position to be taken up by the controlled mechanism, means for reversing the direction of motion of the controlled mechanism, means for starting the mechanism and means for stopping the motion of the controlled mechanism when the selected position is reached, such means for stopping the motion being displaceable with respect to the setting or selecting part, so that when, at each operation the said selecting or setting part is brought into a new position the displacement is automatically taken into account and the direction of motion of the controlled mechanism reversed if necessary to bring the new indication directly into position substantially as described.

4. The combination with an advertising device of the type having one or more units, each unit having advertising elements adapted to be brought successively into exhibiting position, of an electrical selector for denoting the elements to be exhibited, said selector being actuated by electrical impulses, a driving mechanism for moving the elements to exhibiting position, said driving mechanism being controlled by said selector in such a way that when the number of impulses for a fresh indication is greater than the number of impulses for the last indication, the mechanism is caused to rotate in one direction, that is, to continue forward, while when the number of impulses for the fresh indication is less than the number of impulses for the last indication, the mechanism is caused to reverse or rotate in the opposite direction.

5. The combination with an advertising device of the type having one or more units, each unit having advertising elements adapted to be brought successively into exhibiting position, of an electrical selector for denoting the elements to be exhibited, said selector comprising a toothed selector wheel, means for setting such selector wheel forword through any required number of steps by electrical impulses, a counting wheel rotatable about the same axis as the selector for reversing the same, and means for moving the selector wheel back to zero.

15. In an advertising device, a movable advertising member, an electric motor for operating the same, a counter wheel moving in unison with the advertising member, a selector wheel on the shaft of the counter wheel and provided with an arm, a stop on a fixed support and with which the arm is adapted to engage, electrically operated means for moving the selector wheel through a unit distance or a multiple of unit distance, means in the circuit with the motor for reversing the same, means for moving the selector wheel back to zero, and means for locking the several parts in either of the two operative positions.

16. In an advertising device, two drums mounted one above the other, an advertising band secured to the drums, a motor geared with one of the drums, a spring barrel geared with the other drum, a setting and direction mechanism including a counter wheel, a selector wheel and electrically operated means for the selector wheel, projections on the motor driven drum, a slot wheel adapted to engage the projections of the drum, gearing between the slotted wheel and the counter wheel, and means for holding the slot wheel in the position to which it is moved.

In testimony whereof I affix my signature.

HENRY KINGSFORD HARRIS.

wheel and in close proximity thereto, means in connection with the driving mechanism of the exhibiting element for moving the counter wheel simultaneously therewith in either direction, and means controlled by the counting wheel for cutting out the driving mechanism when said counting wheel is brought back to a pretermined position by the movement of the exhibiting element into exhibiting position.

6. In an advertising device, a movable advertising member, an electric motor for operating said member, a movable counter member movable in unison with the advertising member, a movable selector member, means for imparting a step by step movement to the selector member, electrical connections between the counter member and the selector member and in the circuit with the motor, means for stopping the operating means when the counter member and the advertising member come into position determined by the selector member, a stop on a fixed support, and means in connection with the selector member for automatically bringing it back to the said stop after the operating means has been stopped.

7. In an advertising device, a movable advertising member, an electric motor for operating the same, a counter wheel moving in unison with advertising member, a selector wheel, the counter and selector wheels being mounted on a common axis, electrical connections between the counter and selector wheels, electrical means for setting the selector wheel forward through any required number of stops, a stop on a fixed support, for arresting the movement of the selector wheel and means for automatically returning the selector wheel to the said stop.

8. In an advertising device, a movable advertising member, an electric motor for operating the same, a counter wheel moving in unison with the advertising member, a spring actuated selector wheel provided with an arm, a stop on a fixed support and with which the said arm is adapted to engage, electrical connections between the selector and counter wheels, and electrically operated pawl and ratchet mechanism for operating the selector wheel.

9. In an advertising device, a movable advertising member, an electric motor for operating the same, a counter wheel moving in unison with the advertising member, a selector wheel above the counter wheel on the same axis therewith, said selector being provided with an arm, a stop on a fixed support and with which the said arm is adapted to engage, metallic segments on the counter wheel and insulated from one another, brushes carried by the selector wheel and engaging the said segments, and connected with the said motor, and brushes on a fixed support and adapted to make contact with the said segments to complete the circuit, the motor being cut out when the brushes carried by the selector wheel engaging the insulated portions between the segments and the motor reversed when the said brushes pass over the insulated portions to the opposite segment.

10. In an advertising device, a movable member carrying advertising matter, an electric motor for operating the same, a counter wheel moving in unison with the advertising member, a toothed and spring operated selector wheel, means for arresting the movement of the selector wheel, an electrical connection between the counter and selector wheels and motor, and means for moving the selector wheel through a unit distance or a multiple of unit distance, said means comprising a pawl engaging the teeth of the selector wheel, a weak and a powerful magnet, and means for operating the pawl from the said magnets.

11. In an advertising device, a toothed selector wheel, a member mounted on the axis of the said wheel, a pawl carried by said member and engaging the teeth of the selector wheel, a weak magnet for operating said pawl for moving the wheel through a unit distance, and a strong magnet for operating the pawl for moving said wheel through a multiple of unit distance.

12. In an advertising device, a toothed selector wheel, spring actuated arms mounted on the axis of the selector wheel, a pawl carried by one arm and engaging the teeth of the selector wheel, a magnet having its armature engaging the arm carrying the pawl, a solenoid and connection between the core of the solenoid and the other arm.

13. In an advertising device, a toothed and spring actuated selector wheel, spring actuated arms on the axis of the selector wheel, a spring pressed pawl carried by one arm and engaging the teeth of the selector wheel, a magnet having its armature engaging the arm carrying the pawl, a solenoid having its core connected with the other arm, a spring pressed dog engaging the teeth of the selector wheel to prevent return movement of said wheel, said dog having a pin adapted to engage the pawl, and a magnet having its armature connected with the said dog.

14. In an advertising device, a movable advertising member, an electric motor for operating the same, a counter wheel moving in unison with the advertising member, a selector wheel above the counter wheel and on the same axis therewith, said selector wheel being provided with an arm, a stop on a fixed support and with which the arm is adapted to be engaged, electrically operated means for moving the selector wheel through a unit distance or a multiple of unit distance, means in the circuit with the motor